Aug. 2, 1966 A. SUTARUK 3,263,783
VISCOUS DRIVE COUPLING
Filed Oct. 14, 1963 3 Sheets-Sheet 1

INVENTOR.
ALEX SUTARUK
BY *Williams, David,*
*Hoffmann & Yount*
ATTORNEYS

Aug. 2, 1966  A. SUTARUK  3,263,783
VISCOUS DRIVE COUPLING
Filed Oct. 14, 1963  3 Sheets-Sheet 2

INVENTOR.
ALEX SUTARUK
BY Williams, David,
Hoffmann & Yount
ATTORNEYS

Aug. 2, 1966   A. SUTARUK   3,263,783
VISCOUS DRIVE COUPLING
Filed Oct. 14, 1963   3 Sheets-Sheet 3

INVENTOR.
ALEX SUTARUK
BY Williams, David,
Hoffmann & Fount
ATTORNEYS

United States Patent Office 3,263,783
Patented August 2, 1966

3,263,783
VISCOUS DRIVE COUPLING
Alex Sutaruk, Hazel Park, Mich., assignor to Eaton Yale & Towne Inc., a corporation of Ohio
Filed Oct. 14, 1963, Ser. No. 315,972
16 Claims. (Cl. 192—58)

The present invention relates to drive couplings of the type embodying a fluid medium for transmitting torque between relatively rotatable input and output coupling members, and particularly to a shear type fluid drive coupling wherein a fluid shear meduim transmits torque between the rotatable coupling members. Fluid couplings of the above noted type are usable for driving various different kinds of load devices and have particular utility for driving an engine accessory such as a cooling fan device of an internal combustion engine.

The principal object of the present invention is the provision of a new and improved shear type fluid coupling capable of transmitting a relatively high percentage of the input torque delivered to the input coupling member to the output coupling member.

A further object of the present invention is the provision of a new and improved construction for a heavy duty fluid coupling having a relatively high output torque capacity without being substantially larger than known prior art couplings having a lesser output torque capacity.

A further object of the present invention is the provision of a new and improved fluid coupling wherein the input coupling member has surfaces which face axially in opposite directions and which are provided with a plurality of radially spaced projections extending therefrom and substantially parallel to the axis of the coupling members, and said output coupling member has axially spaced surfaces provided with a plurality of radially spaced projections which interfit with those on the input coupling member, thus providing a relatively high capacity fluid coupling without substantially increasing the size of the coupling over known couplings having a lesser capacity.

A further object of the present invention is the provision of a new and improved fluid coupling wherein the output coupling member is a housing member defining a fluid chamber means and which is formed of a cast metal cover member and a main housing member, both of which are provided with radially spaced projections which interfit with the projections extending from the axially facing surfaces of the input member.

A further object of the present invention is the provision of a new and improved fluid coupling having opposed, substantially parallel, spaced shear surfaces on the coupling members defining a shear space therebetween and cooperable with a fluid shear medium in said shear space to transmit torque between the coupling members, and wherein cooling fins carried by the housing member of the coupling and positioned on opposite sides of the shear space provide maximum cooling of the coupling and highly efficient dissipation of heat produced by the transmission of torque from the input coupling member to the output coupling member.

A further object of the present invention is the provision of a new and improved fluid coupling wherein the output coupling member defines a fluid chamber means including a fluid working chamber and a fluid reservoir chamber and wherein the fluid reservoir chamber is located radially inwardly of the shear surfaces which cooperate with the fluid shear medium to transmit torque between the input and output coupling members and the cooling fins are located radially outwardly of the reservoir chamber and in close proximity to the shear surfaces.

A further object of the present invention is the provision of a new and improved fluid coupling having a mechanism for flow of fluid between the fluid working chamber and the fluid reservoir chamber and wherein the fluid reservoir chamber is located radially inwardly of the shear surfaces on the coupling members and wherein the mechanism providing for fluid flow includes a fluid passageway formed in the cover member of the fluid coupling and communicating the fluid working chamber with the fluid reservoir chamber.

Further objects and advantages of the present invention will be apparent to those skilled in the art to which it relates from the following detailed description of a preferred embodiment thereof made with reference to the accompanying drawings forming a part of this specification, and in which, FIG. 1 is an end elevational view, with parts omitted, of a fluid coupling embodying the present invention;

Figure 2:
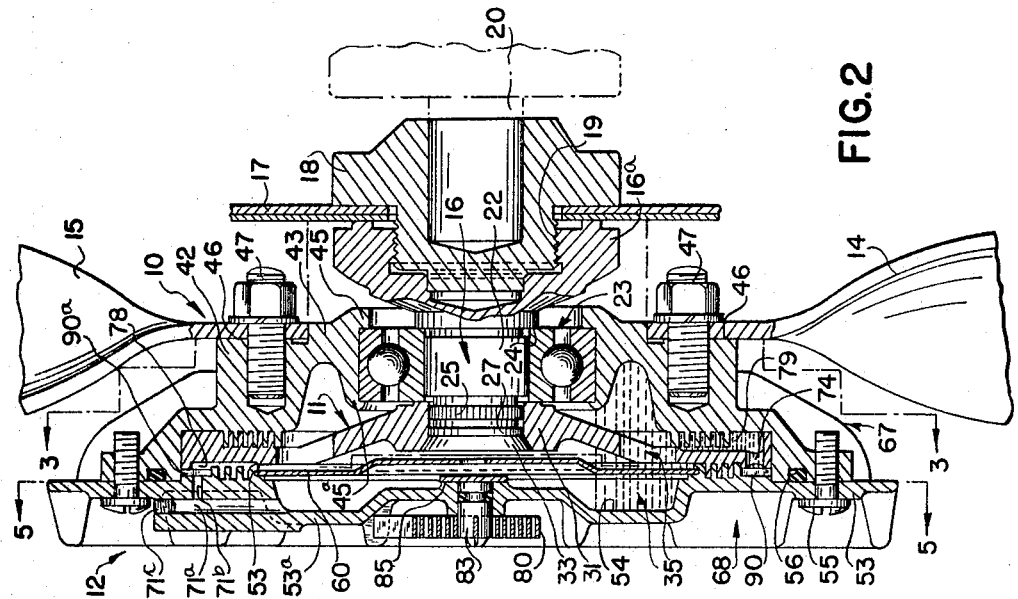
FIG. 2 is an axial sectional view of the fluid coupling shown in FIG. 1 taken approximately as indicated by section line 2—2 of FIG. 1.

The present invention provides in general a fluid coupling wherein a viscous fluid shear medium cooperates with input and output coupling members to transmit torque therebetween, and the coupling is constructed for heavy duty use to provide a relatively high output torque without being excessively large. Also, the volume of the fluid medium cooperating with the input and output coupling members can be varied to vary the amount of torque transmitted to the output coupling member.

As representing an embodiment of the present invention a fluid coupling device 10 is shown in the drawings and includes an input coupling member 11 and an output coupling member 12. The coupling 10 is here shown as a drive for an engine accessory and specifically as a drive for a radiator cooling fan device. It is to be understood, however, that all the novel features of the preferred embodiment of the present invention are not limited in application to a fan drive. Certain of the novel features of the present invention are usable in any application wherein the torque transmission characteristics of a fluid drive are desired along with means to vary the speed differential between the input and output members by varying the amount of the fluid medium transmitting torque between the coupling members.

Referring to the drawings more specifically, FIG. 2 shows a cooling fan engine accessory including cooling fan blades 14 and 15 which are driven from the engine through the fluid coupling 10. The fluid coupling 10 includes an input shaft 16 on which input member 11 is mounted and which is rotatable as by a belt drive including a suitable pulley member 17, only a portion of the latter being shown in the drawings. The pulley member 17 shown in the drawings is a sheet metal pulley, and it should be apparent that a cast iron pulley could also be used. The pulley member 17 may be secured to the shaft 16 in any suitable manner and is herein shown as clamped onto the enlarged right end portion of the shaft 16 by a hub plate 18 which is screwed into a threaded socket 19 formed in the enlarged portion, as viewed in FIG. 2. The shaft 16 has a projecting portion 16a which engages the pulley 17 when it is clamped into engagement with the shaft 16. The projection acts as a spring lock locking the pulley in place by tension deflection. The hub plate 18 has an opening therein which is adapted to receive a stub shaft 20 rotatably mounted in the engine block of the engine.

Figure 1:
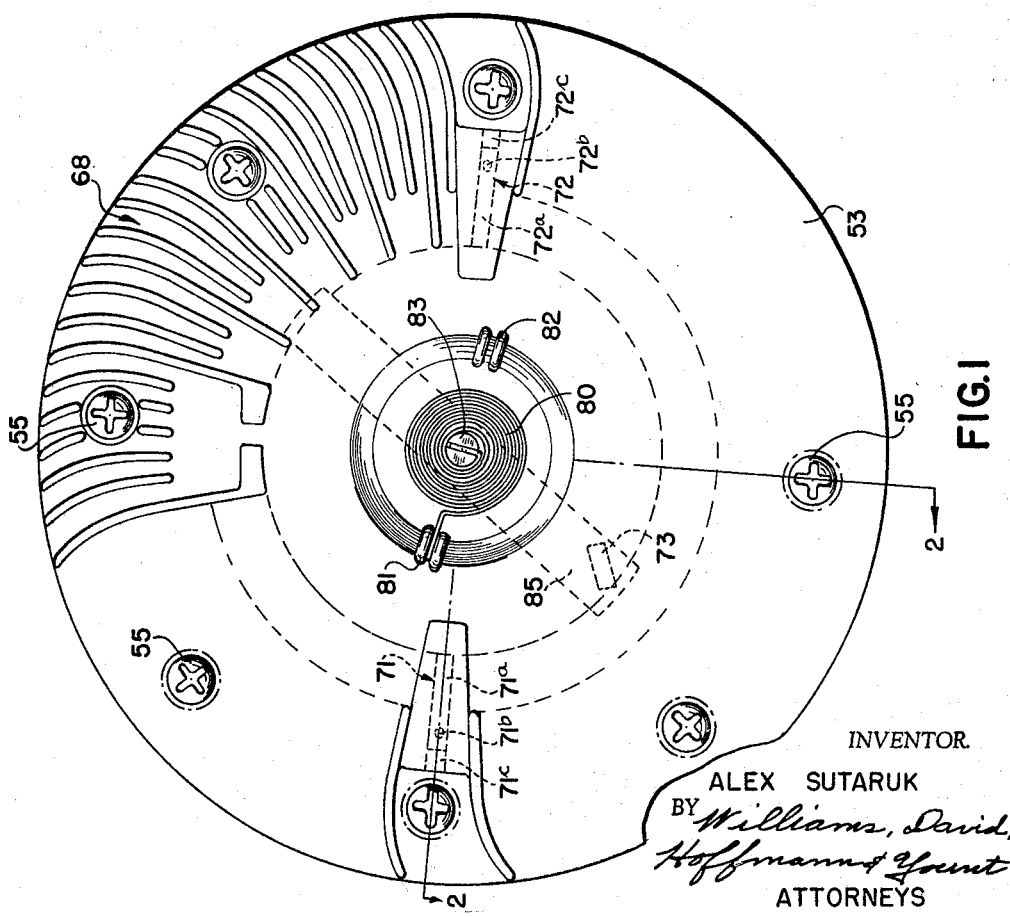

The input shaft 16 has intermediate its ends a reduced shaft portion 22 functioning as a support for the inner race of a ball bearing assembly 23. A shoulder 24 on the shaft 16 prevents movement of the ball bearing assembly in one axial direction, namely, to the right as viewed in FIG. 1. Another shaft portion 25 is provided with surface serrations, and a reduced diameter shaft portion connects shaft portion 25 with a further shaft portion 27 at the end of shaft 16 opposite the end having the threaded socket 19.

The rotatable input or driving member 11 of the fluid coupling 10 is in the form of a disk having a hub portion 31 supported on the shaft 16. The hub portion 31 has an opening therethrough which has an interference fit with the shaft portions 25 and 27. Hub portion 31 is pressed onto the shaft 16 until the inner surface of the hub 31 abuts the side of the inner race of the ball bearing assembly 23 and thus prevents movement of the ball bearing assembly 23 to the left, as viewed in FIG. 1. The left end of the shaft portion 16 has a flared portion 33 which is adapted to hold the disk member from movement toward the left, as viewed in FIG. 2. From the above description it should be apparent that rotation of the shaft 16 causes the input coupling member 11 to be rotated.

The input coupling member 11 rotates in a fluid chamber means 35 formed by the rotatable output or driven coupling member 12. The output coupling member 12 is in the form of a housing and includes a main housing member 42 having a hub portion 43 with an opening therethrough. The opening through the hub portion 43 has an interference fit with the outer race of the ball bearing assembly 23 and is supported thereby for rotation about the axis of the shaft 16. A flange portion 45 engages the right side of the outer race of the ball bearing assembly 23 as viewed in FIG. 1 and blocks housing member 42 from movement in one axial direction. A portion 45a of the housing member 42 is spun over the left side of the ball bearing assembly to prevent movement thereof to the left. The fan blades 14 and 15 are secured to surface portion 46 of the housing member 42 by stud and nut assemblies 47 so as to rotate with the housing member 42.

Figure 4:
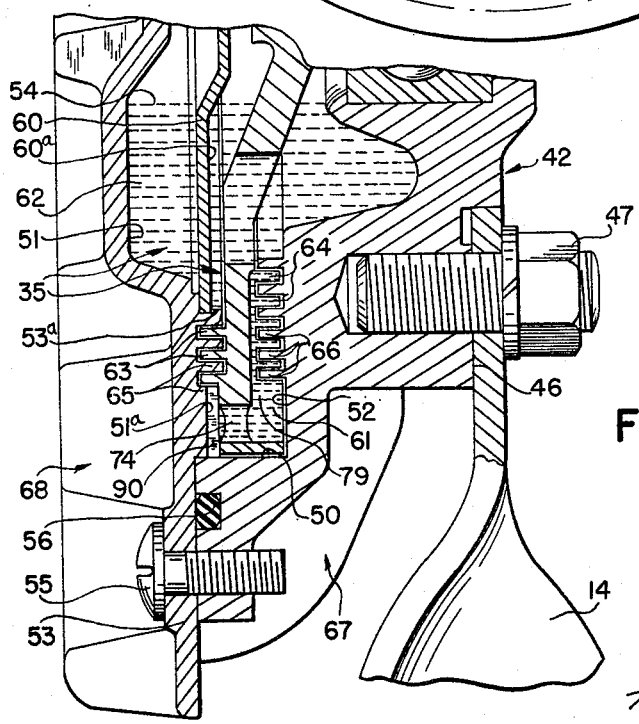
FIG. 4 is a fragmentary axial section corresponding with a portion of the fluid coupling shown in FIG. 2 but on a larger scale.

The fluid chamber means 35 formed by the output member 12 includes a cylindrical surface 50, best seen in FIG. 4, coaxial with the shaft 16 and axially spaced end surfaces 51 and 52. The cylindrical surface 50 is provided by a bore in the housing member 42 and the end surface 52 is located at the bottom of the bore. The end surface 51 of the chamber is provided by a cast metal cover member 53 which is generally dish-shaped and has a centrally located recess 54 therein. The cover 53 is suitably secured to the housing member 42 as by screws 55 extending through the periphery of the cover member 53 and into threaded openings in housing member 42. A suitable sealing means 56 is provided between the cover member 53 and the housing member 42 to prevent fluid leakage therebetween.

The fluid chamber means 35 is divided by a partition member 60 supported by the cover member 53 into a fluid working chamber 61 and a fluid reservoir or storage chamber 62. The partition member 60 is held in place on the cover member 53 by spinning over the cover member as shown at 53a in the drawings. The recess 54 in the cover member 53 forms the reservoir chamber 62, and the working chamber 61 is defined at one end by the surface 52 and at the other end by the outermost surface portion 51a of the end surface 51 of the cover member 53 and by the surface 60a of partition member 60. The surface portion 51a is located radially outwardly of the reservoir chamber 62 and the partition member 60.

The input member 11 is rotatable in the fluid working chamber 61, and is provided with axially spaced surfaces which face axially and in opposite directions. Each of these surfaces has a plurality of radially spaced circumferentially extending projections 63, 64, respectively, which extend substantially parallel to the axis of rotation of the coupling members. The portions of the output member 12 extending on opposite sides of the input member 11 are provided with radially spaced circumferential projections 65, 66 which extend between or interfit with the projections 63, 64, respectively. Specifically, surface 51a of the cover member 53 has a plurality of projections 65 which extend between the projections 63, and surface 52 of the main housing member 42 is provided with a plurality of projections 66 which extend between the projections 64. The projections 63, 65 and 64, 66 provide opposed substantially parallel spaced surfaces defining a shear space therebetween and a fluid shear medium positioned in these shear spaces transmits torque between the opposed surfaces. The fluid medium is shown in FIG. 2 at a level that it takes when the coupling is stationary.

By providing the projections on the opposite axial faces of the input member 11 and the cooperating projections on the cast metal cover member 53 and the housing member 42 a fluid coupling is provided which is well suited for heavy duty service and is capable of transmitting a high percentage of the input torque delivered to the input coupling member to the output coupling member. Furthermore, a coupling is provided having a relatively high output torque capacity but is not substantially larger than couplings having a lesser output capacity. Thus, the coupling 10 is very useful for use in driving an engine accessory for an automobile, truck or bus.

Figure 3:
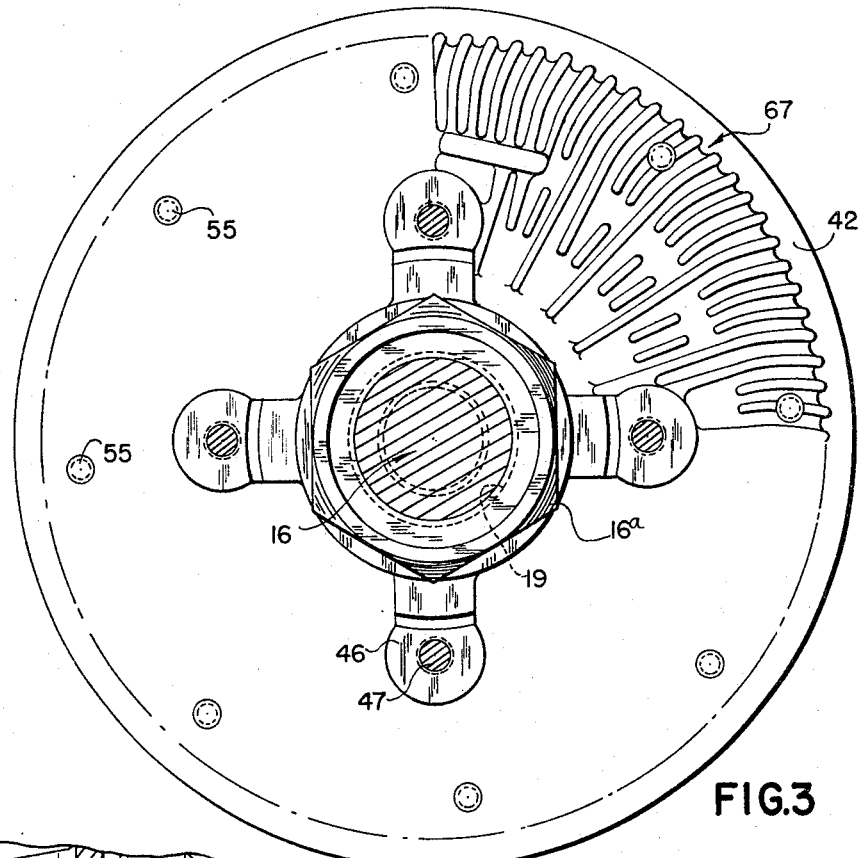
FIG. 3 is a transverse sectional view of the coupling shown in FIG. 2, with parts omitted, taken approximately as indicated by section line 3—3 of FIG. 2.

Because of its relatively high torque transmitting capacity for its size, the fluid coupling 10 is provided with highly effective cooling fin means for cooling the fluid coupling 10 and dissipating the heat produced by the transmission of torque between the input and output coupling members. The cooling fin means includes a plurality of fins 67 located on the housing member 42 and a corresponding plurality of fins 68 located on the cast metal cover member. As can readily be seen from FIG. 2, the fins 67, 68 are positioned in close proximity to the shear spaces provided by the opposed grooves and flanges 63, 65 and 64, 66, respectively, and are located on opposite sides of the shear spaces, thereby providing for efficient dissipation of heat produced by the transmission of torque between the coupling members. Moreover, the cooling fins 67, 68 are located radially outwardly of the reservoir chamber 62, thus directly dissipating heat created in the shear spaces. The relative positioning and shape of the cooling fins 67, 68 on the housing member 42 and cover member 53 can be seen in FIGS. 3 and 2, respectively, which show only a portion of the fins which are provided throughout the housing member 42 and cover member 53 in the same manner as in the portion shown.

As is well known to those skilled in the shear type fluid coupling art, the amount of torque transmitted from the input member 11 to the output member 12 is a function of the volume of fluid in the working chamber and specifically in the above mentioned shear spaces. In the event fluid is not located in any of the shear spaces no torque is transmitted between the input and output members. On the other hand, when fluid fills or partly fills the shear spaces, torque is transmitted therebetween. It should be apparent from the above description that if there is no fluid in the chamber 61, and consequently no fluid in the shear spaces, there would be no transmission of torque between the input and output members and that as the amount of fluid in the chamber 61 increases an increasing amount of torque is transmitted between the input and output member and the speed differential between the members is decreased.

In order to vary the volume of fluid in the chamber 61 and thus vary the torque transmitted and the speed differential between the input and output coupling members, the fluid coupling 10 includes a means providing for fluid flow into and out of the working chamber 61. The fluid supplied to the working chamber 61 flows thereinto from the fluid reservoir chamber 62, and fluid leaving the working chamber 61 flows back into the reservoir chamber 62. The means providing for fluid flow between the reservoir chamber 62 and the fluid working chamber 61 includes a fluid conducting means communicating the reservoir chamber 62 and the working chamber 61, and a mechanism operable to effect fluid flow between the working chamber 61 and the reservoir chamber 62 through the fluid conducting means.

The aforementioned fluid conducting means comprises a pair of passageways 71, 72 formed in the cast metal cover member and which communicate the working chamber 61 with the reservoir chamber 62. Each of the fluid passageways 71, 72 includes a transversely or radially extending passageway portion 71a, 72a, respectively, communicating with the reservoir chamber and an axially directed passageway portion 71b, 72b, respectively, communicating with the radially extending passageway portions 71a, 72a, respectively, and the working chamber 61. The radially extending passageway portions 71b and 72b also communicate with the atmosphere but are plugged by suitable plugs 71c, 72c, respectively. The fluid conducting means further includes a relatively large opening 73 formed in the partition member 60, the function of which will be described hereinbelow.

The mechanism to effect fluid flow between the reservoir chamber 62 and working chamber 61 is operable when fan cooling is not required to effect fluid flow from the working chamber 61 into the reservoir chamber 62 through passageways 71, 72 to thereby increase the speed differential between output member 11 and input member 12. When fan cooling is required the mechanism allows for fluid flow into the working chamber 61 from the reservoir cahmber 62 through opening 73 to increase the torque transmitted between the input and output members, as will be apparent from the description below. A plurality of passages 74 are provided extending through the input member 11 and are located radially outwardly of the projections 63, 64 thereon and function to direct fluid between the opposite sides of the input member when fluid flows into the working chamber 61 and when it flows from the working chamber. A plurality of radially extending V-shaped grooves 78, 79 are provided across the projection 63, 64, respectively, and are of a depth sufficient to extend below the projections 63, 64 and facilitate flow of fluid radially into the area of the projections 63, 64.

Figure 5:
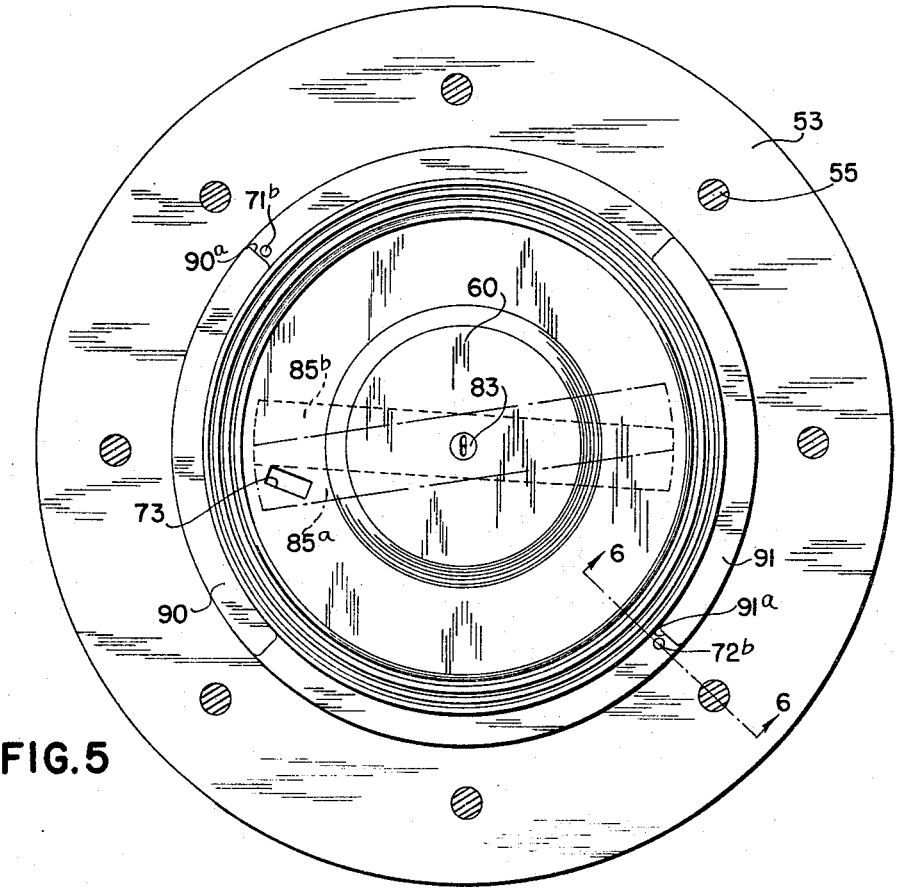
FIG. 5 is a transverse sectional view of the fluid coupling shown in FIG. 2 taken approximately on section line 5—5 thereof.
Figure 6:
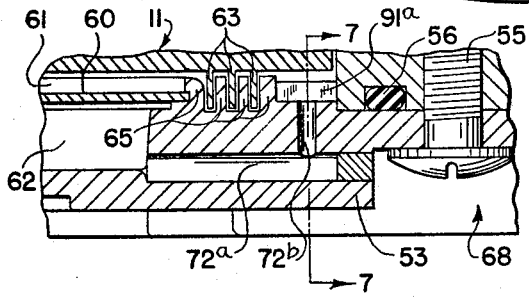
FIG. 6 is a partial sectional view of the fluid coupling embodying the present invention taken approximately on the section line 6—6 of FIG. 5.

The mechanism to effect flow between the chambers includes a helically wound bimetallic temperature responsive coil means 80 supported by the cast metal cover member 53. One end of the helically wound bimetallic temperature responsive means is selectively positioned between retaining means 81 or 82 formed on the cover member 53 and the other end is positioned in a slot formed in a stub shaft 83 rotatably supported by the cover member 53 coaxial with shaft 16. One end of the shaft 83 extends into the reservoir chamber 62, and the other end of the stub shaft 83 receives the end of the bimetallic coil 80 and is pinched together so as to hold the end of helically wound coil 80 onto the stub shaft. An arm member 85 is suitably secured to the end of the stub shaft 83 which extends into the reservoir chamber 62 for rotation therewith. The arm member 85 extends sufficiently to cover opening 73 in the partition member and is moved upon changes in temperature between its dot-dash position 85a covering opening 73 and its dash-dash position 85b wherein it does not cover opening 73, as shown in FIG. 5.

The coil 80 expands or contracts upon changes in temperature, depending upon whether there is an increase or decrease in the temperature. When the coil 80 expands or contracts it rotates the shaft 83 and also rotates the arm member 85 between its positions 85a, 85b. Upon a temperature increase, the coil 80 expands and causes rotation of the member 85 to its position 85b, in which position arm member 85 does not cover or block opening 73 in the partition member. Upon a reduction in temperature the coil 80 contracts and the arm member 85 is moved thereby to position 85a. When arm member 85 is in the position 85a it blocks the flow of fluid through opening 73. When the arm member is in position 85b it allows for the flow of fluid through the opening 73 in the partition member 60, and fluid then flows from the reservoir chamber 62 into the working chamber 61. At intermediate positions of the arm member 85 a certain amount of fluid flows into the working chamber 62, depending upon the amount of opening 73 that is unblocked.

Figure 7:
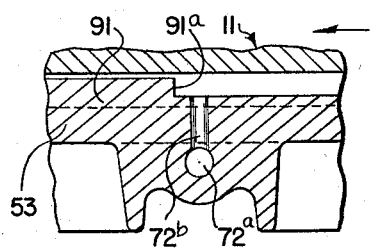
FIG. 7 is a fragmentary sectional view taken approximately on the section line 7—7 of FIG. 6.

Fluid flow is effected from the working chamber 61 into the reservoir chamber 62 through the fluid passageways 71, 72 in the cover member by a pair of pumping or impact elements 90, 91, respectively, supported by and formed integrally with the cover member 53. The pumping elements 90, 91 project into the working chamber 61 and are positioned in the working chamber radially outwardly of the interfitting projections 63, 65 and are diametrically opposed. The fluid conducting passageways 71b, 72b which extend axially of the coupling members open into the working chamber 61 adjacent to the pumping elements 90, 91, respectively. The passageways 71b, 72b are spaced circumferentially from the pumping elements 90, 91, respectively, so as to trail the pumping elements 90, 91, respectively, upon rotation of the cover member 53. The direction of rotation of the input and output coupling members is indicated by the arrow in FIG. 7.

The input member 11 being the driving member, rotates at a speed faster than the speed of the output member 12 and thus causes fluid to be impacted against the axially extending surfaces 90a, 91a, of the pumping elements 90, 91, respectively. This causes a pressure to build up adjacent the surfaces 90a, 91a which pressure is directed by the passageways 70, 71, respectively, into the reservoir chamber 62.

Fluid continually flows through passages 70, 71 by the above described action of the pumping elements 90, 91, and in the event the opening 73 is covered by the arm member 85 fluid does not flow into the working chamber 61 and thus there is a decrease in the amount of fluid in the working chamber 61 and an increase in the speed differential between the input and output members. However, in the event that the opening 73 is opened, fluid flows therethrough into the working chamber 61 at a faster rate than it flows through the passages 70, 71 into the reservoir chamber, and therefore there is a net increase in the volume of fluid in the working chamber 61 and a decrease in the speed differential between the input and output members.

Thus it should be apparent from the above description that the embodiment of the present invention described hereinabove provides a highly improved fluid coupling having a higher output torque capacity than known fluid couplings without a substantial increase in the size of the coupling device, and wherein the heat created by the higher capacity coupling may be readily dissipated from the coupling member so as to render the fluid coupling suitable for use on trucks and buses. Moreover, it should be readily apparent that a new and improved fluid coupling is provided having a novel arrangement for providing for fluid flow into and from the fluid working chamber wherein the fluid reservoir chamber is located radially inwardly of the shear surfaces.

It should be understood that the fluid coupling disclosed herein and embodying the features of the present invention may be constructed in different sizes and that certain modifications may be necessary in the different sized couplings while they would be substantially the same. Moreover, it should be understood that the preferred embodiment of the present invention has been described herein in considerable detail and that certain modifications, changes and adaptations may be made therein by those skilled in the art and that it is hereby intended to cover all modifications, changes and adaptations thereof falling within the scope of the appended claims.

Having described my invention, I claim:

1. A fluid coupling comprising first and second relatively rotatable coupling members, said first coupling member having axially spaced surfaces each of which has a plurality of radially spaced projections extending therefrom and substantially parallel to the axis of rotation of said coupling members, said second coupling member having a plurality of projections interfitting with the plurality of spaced projections on said first coupling member, and said projections on coupling members providing opposed substantialy parallel spaced surfaces having a shear space therebetween and cooperable with a fluid shear medium in said shear space to transmit torque between said members.

2. A fluid coupling comprising first and second relatively rotatable coupling members, said first coupling member having axially spaced surfaces each of which has a plurality of radially spaced projections extending therefrom and substantially parallel to the axis of rotation of said coupling members, said second coupling member positioned between said axially spaced surfaces and having opposite surfaces facing said axially spaced surfaces of said first coupling member, said opposite surfaces having a plurality of projections extending therefrom and interfitting with the plurality of spaced projections on said first coupling member, and said projections on said coupling members providing opposed, substantially parallel spaced surfaces having a shear space therebetween and cooperable with a fluid shear medium in said shear space to transmit torque between said members.

3. A fluid coupling as defined in claim 2 wherein said first coupling member includes a main housing member and a cover member secured to said main housing member and said axially spaced surfaces are provided thereon and define therebetween a fluid working chamber in which the second coupling member is rotatable.

4. A fluid coupling as defined in claim 3 wherein said cover member is dish-shaped and includes a central recess portion providing a fluid reservoir chamber separated from the working chamber by a partition member, and wherein means is provided for communicating the reservoir chamber with the working chamber to provide for the flow of fluid therebetween to vary the torque transmitted between said coupling members.

5. A fluid coupling as defined in claim 3 wherein said cover member includes a central recess portion providing a fluid reservoir chamber separated from the working chamber by a partition member, said reservoir chamber being spaced radially inwardly of said projections on one of said axially spaced surfaces of said first coupling member and the projections on said second coupling member interfitting with the projections on said one of said axially spaced surfaces.

6. A fluid coupling as defined in claim 3 wherein said cover member includes a central recess portion providing a fluid reservoir chamber separated from the working chamber by a partition member, said reservoir chamber being spaced radially inwardly of said projections on one of said axially spaced surfaces of said first coupling member and the projections on said second coupling member interfitting with the projections on said one of said axially spaced surfaces, a first plurality of cooling fins on said cover member on one axial side of the working chamber and a second plurality of cooling fins on said housing member on the other axial side of the working chamber so as to provide maximum dissipation of heat produced by the transmission of torque between said first and second coupling members.

7. A fluid coupling comprising first and second relatively rotatable coupling members, said first coupling member comprising a housing including a main housing member and a cover member defining a fluid chamber means and a partition member dividing said fluid chamber means into a fluid working chamber and a fluid reservoir chamber, means providing for flow of fluid between said chambers, said second coupling member having a portion rotatable in said fluid working chamber, said portion including opposite axially facing surfaces having a plurality of radially spaced projections extending therefrom and substantially parallel to the axis of rotation of said coupling members, said housing having axially spaced surfaces each of which has a plurality of radially spaced projections extending therefrom and interfitting with the projections on said opposite axially facing surfaces of said second coupling member, and said projections on said coupling members providing opposed substantially parallel spaced surfaces having a shear space therebetween and cooperable with a fluid shear medium in said shear space to transmit torque between said members.

8. A fluid coupling comprising first and second relatively rotatable coupling members, said first coupling member defining a fluid reservoir chamber and having axially spaced surfaces defining a fluid working chamber, each of said axially spaced surfaces having a plurality of radially spaced projections extending therefrom and substantially parallel to the axis of rotation of the coupling members, said second coupling member positioned between said axially spaced surfaces and having opposite surfaces facing said axially spaced surfaces, said opposite surfaces having a plurality of projections extending therefrom and interfitting with the plurality of projections on said first coupling member, said projections providing opposed substantially parallel spaced surface portions forming a shear space therebetween and cooperable with a fluid shear medium in said shear space to transmit torque between said members, and means providing for fluid flow between said reservoir chamber and said working chamber to vary the volume of fluid in said shear spaces and the amount of torque transmitted between said coupling members.

9. A fluid coupling comprising first and second relatively rotatable coupling members, said first coupling member including a main housing member and a cover member secured to said housing member, said housing member and said cover member having axially spaced surfaces defining a fluid chamber means therebetween, each of said axially spaced surfaces having a plurality of radially spaced projections extending therefrom and substantially parallel to the axis of rotation of the coupling members, said second coupling member positioned between said axially spaced surfaces and having opposite surface portions facing said axially spaced surfaces, said opposite surface portions having a plurality of projections extending therefrom and interfitting with the plurality of projections on said first coupling member, said projections providing opposed substantially parallel spaced surface portions forming a shear space therebetween, a partition member forming a part of said first coupling member and dividing said chamber means into a fluid working chamber and a fluid reservoir chamber, the interfitting projections extending into said working chamber and said reservoir chamber being located radially inwardly of the projections on said cover member, and means providing for fluid flow between said reservoir chamber and said working chamber to vary the volume of fluid in said shear spaces and the amount of torque transmitted between said coupling members.

10. A fluid coupling as defined in claim 9 wherein said cover member is a dish-shaped member having a centrally located recess and said partition member covers said centrally located recess defining said recess as said reservoir chamber.

11. A fluid coupling as defined in claim 9 wherein said cover member is provided with fluid passageway means communicating said reservoir chamber with said working chamber and through which fluid flows from the working chamber into the reservoir chamber and said partition member is provided with an opening communicating said reservoir chamber with said working chamber and through which fluid flows from the reservoir chamber into the working chamber.

12. A fluid coupling as defined in claim 9 further including cooling fin means located on said cover member and said housing member on opposite sides of said working chamber to dissipate heat produced by the transmission of torque between said coupling members.

13. A fluid coupling as defined in claim 9 wherein said cover member is provided with fluid passageway means communicating said reservoir chamber with said working chamber and through which fluid flows from the working chamber into the reservoir chamber and said partition member is provided with an opening communicating said reservoir chamber with said working chamber and through which fluid flows from the reservoir chamber into the working chamber and the coupling further includes an arm member movable to block and unblock said opening in said partition member so as to control the flow of fluid from the reservoir chamber into the working chamber through said opening.

14. A fluid coupling as defined in claim 9 wherein said cover member is provided with fluid passageway means communicating said reservoir chamber with said working chamber and through which fluid flows from the working chamber into the reservoir chamber and said partition member is provided with an opening communicating said reservoir chamber with said working chamber and through which fluid flows from the reservoir chamber into the working chamber and the coupling further includes an arm member movable to block and unblock said opening in said partition member so as to control the flow of fluid from the reservoir chamber into the working chamber through said opening and a temperature responsive device operable to move said arm member in response to changes in temperature.

15. A fluid coupling comprising first and second relatively rotatable coupling members, said first coupling member defining a fluid working chamber and a fluid reservoir chamber, said second coupling member having at least a portion thereof rotatable in said fluid working chamber, said coupling members having opposed substantially parallel spaced surface portions forming a shear space therebetween located radially outwardly of said reservoir chamber and cooperable with a fluid shear medium in said shear space to transmit torque between said members, and means providing for fluid flow from said reservoir chamber to said working chamber and from said working chamber to said reservoir chamber to vary the volume of fluid in said shear space and the amount of torque transmitted between said coupling members, said means including a fluid passageway means through which fluid flows into the reservoir chamber and formed in said cover member.

16. A fluid coupling as defined in claim 15 wherein said fluid passageway includes an axially directed passage portion communicating with the working chamber and a radially extending passage portion communicating with the reservoir chamber and the axially directed passage portion so as to provide for fluid flow from the working chamber into the reservoir chamber.

References Cited by the Examiner

UNITED STATES PATENTS

| | | | |
|---|---|---|---|
| 2,883,884 | 4/1959 | Norton | 192—58 X |
| 2,948,268 | 8/1960 | Roper et al. | 192—58 X |
| 3,055,473 | 9/1962 | Oldberg et al. | 192—58 |
| 3,059,745 | 10/1962 | Tauschek | 192—58 |
| 3,135,370 | 6/1964 | Sutton | 192—58 |

DAVID J. WILLIAMOWSKY, *Primary Examiner.*

DON A. WAITE, *Examiner.*

A. T. McKEON, *Assistant Examiner.*